United States Patent
Kaneko et al.

(10) Patent No.: US 8,471,722 B2
(45) Date of Patent: Jun. 25, 2013

(54) DIRECTION INDICATOR SYSTEM, AND ELECTRIC WHEELCHAIR, WALKING STICK, AND GAME CONTROLLER UTILIZING SAID DIRECTION INDICATOR SYSTEM

(75) Inventors: Masahiro Kaneko, Shinagawa (JP); Satoshi Sakurai, Shinagawa (JP); Nobuo Yatsu, Shinagawa (JP); Takuya Uchiyama, Shinagawa (JP); Yuriko Segawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 575 days.

(21) Appl. No.: 12/010,557

(22) Filed: Jan. 25, 2008

(65) Prior Publication Data

US 2008/0180267 A1 Jul. 31, 2008

(30) Foreign Application Priority Data

Jan. 25, 2007 (JP) ................................ 2007-015421

(51) Int. Cl.
*B60R 25/10* (2006.01)
*G08B 5/00* (2006.01)
*B62D 57/00* (2006.01)
*H04N 7/18* (2006.01)

(52) U.S. Cl.
USPC ............ 340/815.64; 340/539.13; 340/426.31; 180/7.1; 180/211; 348/139; 280/250; 701/25; 701/1; 84/609

(58) Field of Classification Search
USPC .......................... 340/815.64, 539.13, 426.31
See application file for complete search history.

(56) References Cited

U.S. PATENT DOCUMENTS

| 4,712,003 | A | * | 12/1987 | Ban et al. ...................... 250/221 |
| 5,445,233 | A | * | 8/1995 | Fernie et al. .................. 180/6.5 |
| 5,794,730 | A | * | 8/1998 | Kamen .......................... 180/7.1 |
| 5,915,288 | A | * | 6/1999 | Gabriel .......................... 84/609 |
| 6,320,487 | B1 | * | 11/2001 | Miller et al. .................. 335/274 |
| 6,320,496 | B1 | * | 11/2001 | Sokoler et al. ............. 340/407.1 |
| 7,383,107 | B2 | * | 6/2008 | Fehr et al. ....................... 701/25 |
| 2003/0090460 | A1 | * | 5/2003 | Schena et al. ................. 345/156 |
| 2005/0098086 | A1 | * | 5/2005 | Moore ........................... 116/205 |
| 2005/0195166 | A1 | * | 9/2005 | Cooper et al. ................ 345/161 |
| 2005/0279551 | A1 | * | 12/2005 | LoPresti ....................... 180/167 |
| 2006/0229770 | A1 | * | 10/2006 | Strong ............................. 701/1 |
| 2007/0033541 | A1 | * | 2/2007 | Sakurai et al. ................ 715/776 |

(Continued)

FOREIGN PATENT DOCUMENTS

| JP | 06-059803 | 3/1993 |
| JP | 08-254435 | 10/1996 |
| JP | 2000-352521 | 12/2000 |
| WO | 2007/002775 | 1/2007 |

OTHER PUBLICATIONS

Japanese Office Action issued Jul. 5, 2011 in corresponding Japanese Application No. 2007-015421 (2 pages) (3 pages English Translation).

*Primary Examiner* — Jennifer Mehmood
*Assistant Examiner* — Fekadeselassie Girma
(74) *Attorney, Agent, or Firm* — Staas & Halsey LLP

(57) ABSTRACT

A direction indicator system includes: an electromagnetic drive actuator that has a moving part that can slide back and forth, side to side, and diagonally; and a drive controlling unit that controls the sliding direction of the moving part, based on direction indicating information that is supplied from the outside.

12 Claims, 18 Drawing Sheets

U.S. PATENT DOCUMENTS

2007/0284845 A1* 12/2007 Roovers et al. ............ 280/250.1
2008/0035402 A1* 2/2008 Amira et al. .................. 180/211
2008/0269959 A1* 10/2008 Wakefield ........................ 701/1
2010/0141759 A1* 6/2010 Scherzinger ................. 348/139

* cited by examiner

Voltage Waveform

Voltage Waveform

Voltage Waveform

DIRECTION INDICATOR SYSTEM, AND ELECTRIC WHEELCHAIR, WALKING STICK, AND GAME CONTROLLER UTILIZING SAID DIRECTION INDICATOR SYSTEM

BACKGROUND OF THE INVENTION

1. Field of the Invention

The present invention generally relates to a direction indicator system that indicates a direction with the use of an actuator, and more particularly, to a direction indicator-system-that is incorporated into various structures, and precisely presents a direction to a user (or an operator) by stimulating the tactual sensation of the user. The present invention also relates to devices such as an electric wheelchair that utilizes the direction indicator system.

2. Description of the Related Art

For example, Japanese Unexamined Patent Publication No. 2000-352521 discloses a system for assisting users who use a navigation device. More specifically, Japanese Unexamined Patent Publication No. 2000-352521 discloses a navigation assistance system that shows a direction to a user through a sensory direction indicating device. A tactual direction indicating device in this system determines the tactual cueing necessary for the user, and retracts, erects, or vibrates movable pegs. The movable pegs stimulate the tactual sensation of the user, so as to inform the user of the traveling direction to be taken. As the user can recognize the traveling direction through the stimulation of the tactual sensation, less attention needs to be paid to the display.

As described above, by the technique disclosed in Japanese Unexamined Patent Publication No. 2000-352521, the navigation information that is conventionally transmitted through the visual or auditory sense is reinforced by stimulating the tactual sensation of the user. With this arrangement, the attention of the user to be paid to the display or sound can be reduced.

As described above, the tactual direction indicating device moves the movable pegs, so as to indicate a direction. Here, the movable pegs are stick-like members like nails or piles. The movable pegs are retracted, erected, or vibrated, so as to indicate a direction. In the tactual direction indicating device disclosed in Japanese Unexamined Patent Publication No. 2000-352521, several movable pegs are provided, and are moved up and down (retracted/erected) in accordance with the presented information, so as to stimulate the tactual sensation of the user.

Since a driving mechanism and a logic circuit for selectively moving the movable pegs up and down in accordance with position information are required, the components around the movable pegs become complicated. Meanwhile, the movable pegs are designed to move to push a finger of the user. In this manner, the tactual sensation of the user is stimulated, and information is presented to the user. However, the movable pegs are thin, needle-like structures. If the movable pegs are pushed up by strong force, the device becomes dangerous. On the other hand, if the movable pegs are pushed by weak force, the user might not recognize the stimulation of the tactual sensation. If the movable pegs are formed as stick-like members each having a certain thickness, the structure for moving the movable pegs becomes larger. Also, the tactual direction indicating device disclosed in Japanese Unexamined Patent Publication No. 2000-352521 can be used as an assistant device for assisting the transmission of position information through the visual or auditory sense of the user during a navigating operation. However, it is difficult for this tactual direction indicating device alone to certainly inform the user of the traveling direction. Therefore, if the user is a visually impaired person or a hearing-impaired person, it is difficult to utilize the technique disclosed in Japanese Unexamined Patent Publication No. 2000-352521.

SUMMARY OF THE INVENTION

It is therefore an object of the present invention to provide a direction indicator system in which the above disadvantages are eliminated.

A more specific object of the present invention is to provide a direction indicator system that stimulates the tactual sensation of a user with the use of a simple structure, and certainly performs a direction indication based on direction indicating information.

Another specific object of the present invention is to provide an electric wheelchair, a walking stick, and a game controller that certainly informs a user of an indicated direction, by employing the above system.

According to an aspect of the present invention, there is provided a direction indicator system including: an electromagnetic drive actuator that has a moving part that can slide back and forth, side to side, and diagonally; and a drive controlling unit that controls a sliding direction of the moving part, based on direction indicating information that is supplied from the outside. In accordance with this invention, the drive controlling unit controls the sliding action of the moving part of the electromagnetic drive actuator, based on the direction indicating information supplied from the outside. Accordingly, the moving part can stimulate the tactual sensation of the user at his/her finger, hand, or elbow at a certain distance. In this manner, a direction can be presented by stimulating the tactual sense of the user, instead of the visual or auditory sense. Thus, even if the user is a visually impaired person or a hearing-impaired person, the user can be certainly informed of a desired direction.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

In a direction indicator system in accordance with the present invention, a flat-type electromagnetic drive actuator is used. This electromagnetic drive actuator has a moving part that can slide back and forth, side to side, and diagonally. In the following, this electromagnetic drive actuator is first described, and examples of direction indicator devices that use this electromagnetic drive actuator are then described, with reference to the accompanying drawings.

In the electromagnetic drive actuator, the moving part (hereinafter referred to as the key top) for stimulating the tactual sensation of the operator (user) at his/her hand or fingers is designed to slide back and forth, side to side, and diagonally. Referring to the accompanying drawings, the structure of the electromagnetic drive actuator is described. The Fleming's left-hand rule is applied to this electromagnetic drive actuator. More specifically, the key top is designed to move in a plane (to slide) by taking advantage of the electromagnetic force that is generated according to the Fleming's left-hand rule.

Figure 1A:
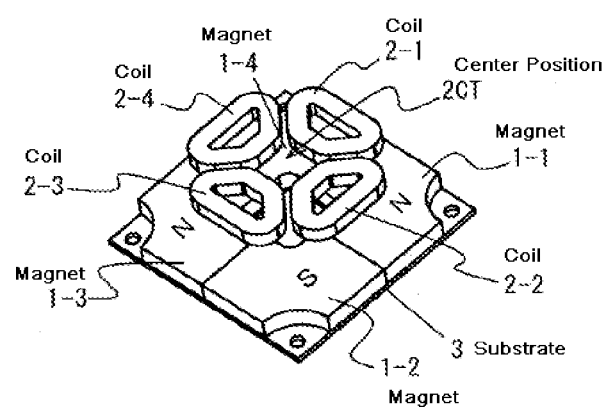
FIG. 1A is a perspective view schematically showing the relationship between four magnets and four coils of an electromagnetic drive actuator.
Figure 1B:
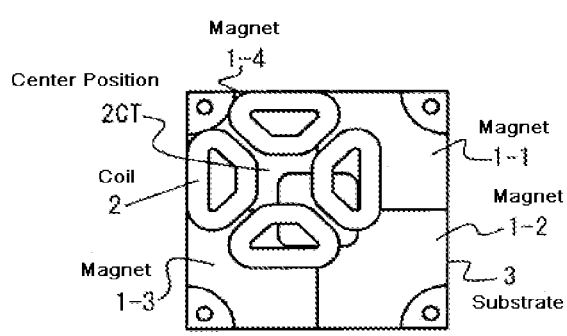
FIG. 1B is a plan view of the electromagnetic drive actuator.
Figure 1C:
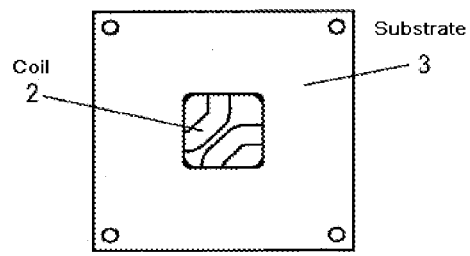
FIG. 1C is a bottom view of the electromagnetic drive actuator.

FIGS. 1A through 1C schematically show the structure of the electromagnetic drive actuator and the positional relationship among the components of the electromagnetic drive actuator. FIG. 1A is a perspective view showing the relationship between four magnets 1 (1-1 through 1-4) and four coils 2 (2-1 through 2-4). FIG. 1B is a plan view of the electromagnetic drive actuator. FIG. 1C is a bottom view of the electromagnetic drive actuator. The four magnets 1-1 through 1-4 are fixed onto a substrate 3 that serves as a yoke. The four coils 2-1 through 2-4 are placed so as to face the magnets 1. When the current to be supplied to the coils 2 is controlled, the coils 2 are two-dimensionally (in-plane) moved relative to the magnets 1, while facing the magnets 1. In other words, the coils are designed to slide relative to the magnets 1. The magnets 1 may be permanent magnets or electromagnets. In a case where permanent magnets are employed, few magnets may be combined, or magnetic poles may be formed in a magnetic material by performing a magnetizing operation. For example, as the magnets 1 shown in FIG. 1B, two magnets may be employed, or four magnetic poles may be formed in a magnetic material through a magnetizing operation. In the structure shown in FIGS. 1A through 1C, the coils 2 may be fixed, and the magnets 1 may be moved. In the example described below, however, the magnets 1 are fixed, and coils 2 are moved.

Figure 2:
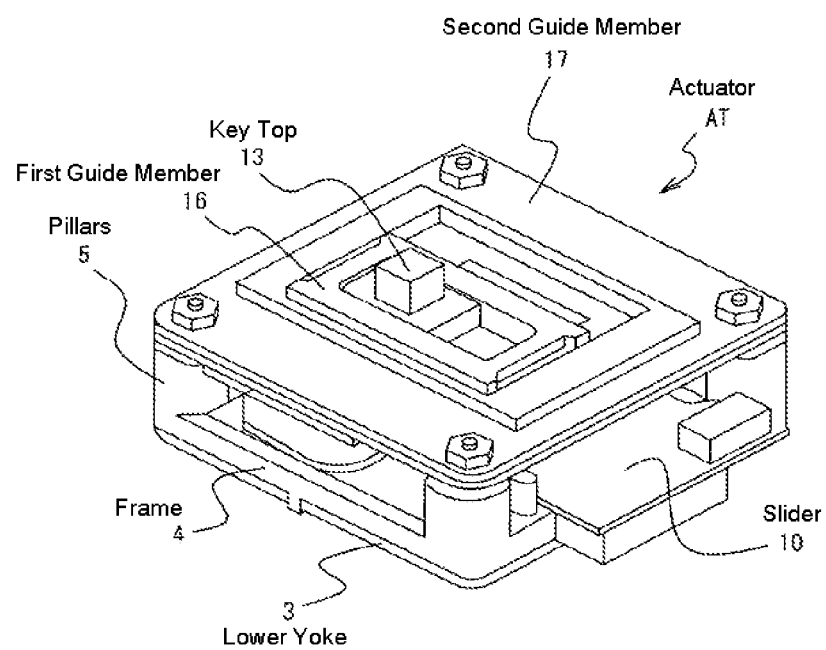
FIG. 2 is an external perspective view of an actuator in an assembled state.
Figure 3:
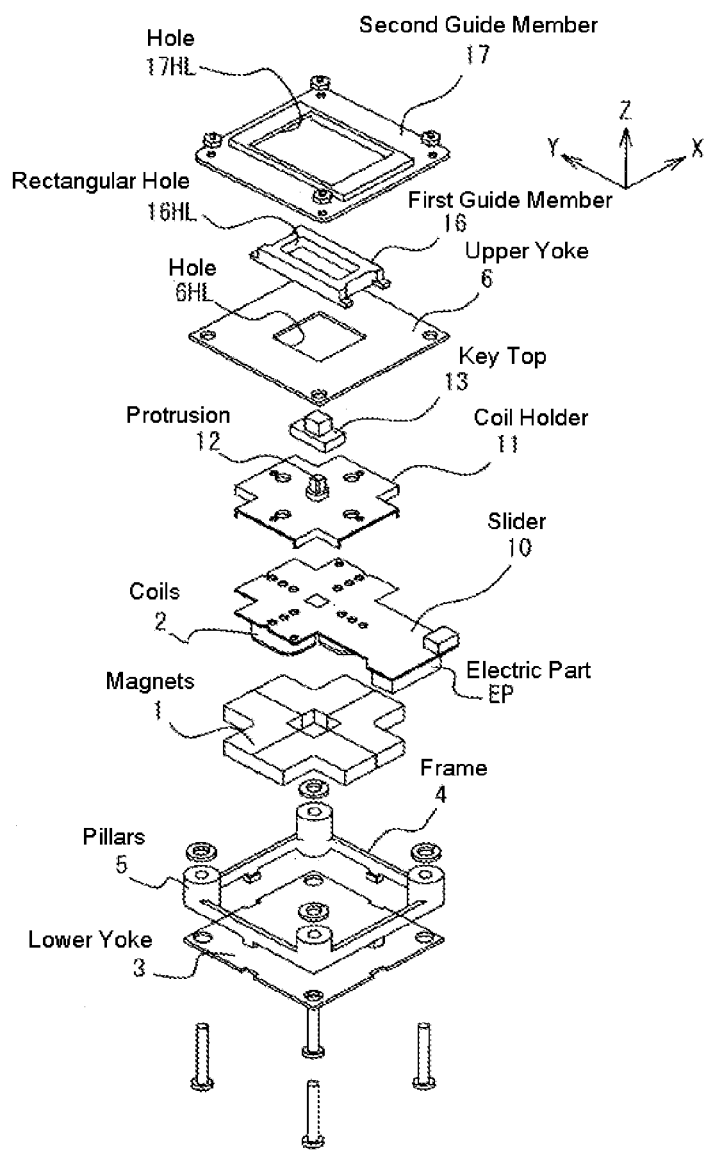
FIG. 3 is an exploded perspective view of the actuator.

FIGS. 2 and 3 illustrate an electromagnetic drive actuator (hereinafter referred to as the actuator AT) in greater detail. In FIGS. 2 and 3, the components equivalent to those shown in FIGS. 1A through 1C are denoted by the same reference numerals as those in FIGS. 1A through 1C. FIG. 2 is an external perspective view of the actuator AT in an assembled state. FIG. 3 is an exploded perspective view of the actuator AT. As will be described later, the actuator AT is incorporated into a device or apparatus such as an electric wheelchair, a walking stick, or a game controller. The actuator AT is in the form of a driver component that slides based on direction indicator information provided from the outside.

The actuator AT is formed on a lower yoke 3 that functions as the substrate. Magnets 1 that are the same as the magnets 1 shown in FIGS. 1A through 1C are placed on the lower yoke 3. A frame 4 is also provided on the lower yoke 3, and support pillars 5 that functions as spacers and supporting members stand at the four corners of the frame 4. The support pillars 5 form a predetermined space above the lower yoke 3, and an upper yoke 6 is placed on the support pillars 5. A slider 10 having the coils 2 fixed thereto is movably accommodated in the space formed between the upper and lower yokes 3 and 6. The slider 10 is designed to slide two-dimensionally with the thrust force that is generated between the coils 2 and the magnets 1 when a current is supplied to the coils 2. A guide mechanism is formed on the upper yoke 6. The guide mechanism is designed to move the slider 10 in a predetermined two-dimensional region (X-Y plane movement).

The slider 10 holds the coils 2 under its lower face. The coils 2 are fixed to the lower face of the slider 10 with a coil holder 11 that is provided on the slider 10. The coil holder 11 moves with the slider 10. A protrusion 12 is formed on the upper face of the coil holder 11. A key top 13 is engaged with the protrusion 12. The key top 13 is accommodated in a hole 6HL formed at the center of the upper yoke 6. When the actuator AT is in an assembled state, the key top 13 protrudes from the upper face of the upper yoke 6, as shown in FIG. 2. The key top 13 is placed in the center position 2CT (see FIGS. 1A and 1B) of the coils 2 fixed to the lower face of the slider 10. A circuit board is also interposed between the lower face of the slider 10 and the coils 2. An electric part EP and the likes are placed in the circuit board, and a predetermined circuit pattern is formed on the circuit board.

A mechanism for moving the slider 10 in a predetermined two-dimensional region is formed on the upper yoke 6. This moving mechanism is now described. In the actuator AT of this example, the key top 13 that moves with the slider 10 is engaged with a guide member, so that the slider 10 moves in the predetermined two-dimensional region.

To guide the key top 13 in the X-axis direction and the Y-axis direction, the actuator AT has a first guide member 16 and a second guide member 17. As shown in FIG. 3, the first guide member 16 guides the key top 13 within a predetermined range in the Y-axis direction. The first guide member

16 has a rectangular hole 16HL at its center, and this hole 16HL accommodates the key top 13. With this arrangement, the first guide member 16 guides the key top 13 in the Y-axis direction.

Further, the first guide member 16 is guided in the X-axis direction, which is perpendicular to the Y-axis direction, by the second guide member 17. The second guide member 17 accommodates the first guide member 16 in a hole 17HL, so as to guide the first guide member 16 in the X-axis direction.

In the above described structure, the key top 13 is guided in the Y-axis direction by the first guide member 16, and the first guide member 16 is guided in the X-axis direction, which is perpendicular to the Y-axis direction, by the second guide member 17. Accordingly, when the slider 10 having the coils 2 is subjected to predetermined thrust force, the key top 13 slides in the two-dimensional region (the X-Y plane). More specifically, the current to be supplied to the four coils 2 (2-1 through 2-4) is controlled, so that the key top 13 slides in the Y-axis direction (back and forth) and the X-axis direction (from side to side) perpendicular to the Y-axis direction, and a diagonal direction formed as a combination of those two directions.

By controlling the electric signal to be supplied to the coils 2, the above described actuator AT can cause the key top 13 to slide back and forth, from side to side, and diagonally. Accordingly, the actuator AT is incorporated into a device or apparatus, so as to form a direction indicator system that can present a desired direction by stimulating the tactual sensation at a hand or a finger of the operator with the key top 13. More specifically, the current to be supplied to the coils 2 is controlled, and the key top 13 is caused to slide in the direction to be presented, so that the operation can recognize the desired direction. Further, the sliding operation is repeated, so as to make sure that the operator recognizes the desired direction.

The following is a description of an electric wheelchair and a walking stick that have route guide functions, and a game controller that has a function for aiding disabled people. A direction indicator system that includes the above described actuator AT is applied to those devices as embodiments of the present invention.

[First Embodiment]

Figure 4:
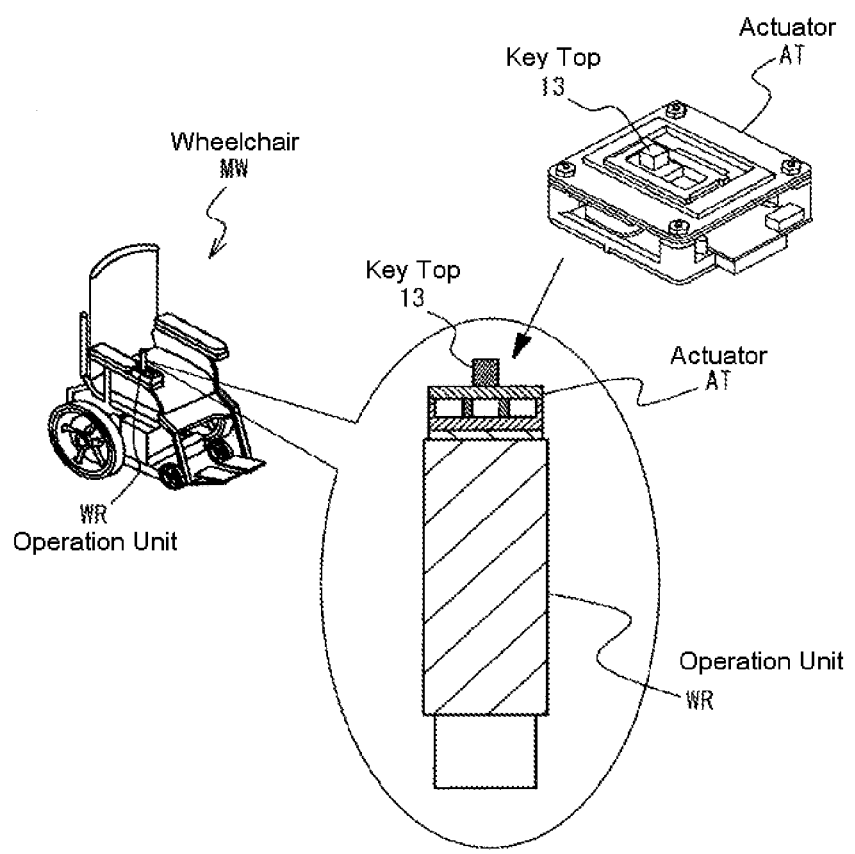
FIG. 4 shows an electric wheelchair that uses the actuator in accordance with a first embodiment of the present invention.

FIG. 4 illustrates an electric wheelchair MW in accordance with a first embodiment that employs the actuator AT. The actuator AT is used as the operation unit WR of the electric wheelchair MW. In FIG. 4, the operation unit WR is shown in an enlarged view in an ellipse. The operation unit WR has a stick-like shape. For example, the operation unit WR is tilted in a desired direction, the electric wheelchair MW can be moved. The actuator AT is embedded in the upper end portion of the operation unit WR. When an operator grabs the operation unit WR, his/her thumb should touch the key top 13 of the actuator AT. Accordingly, when the key top 13 slides in a predetermined direction, the operator can sense the movement through stimulation of the tactual sensation.

Figure 5:
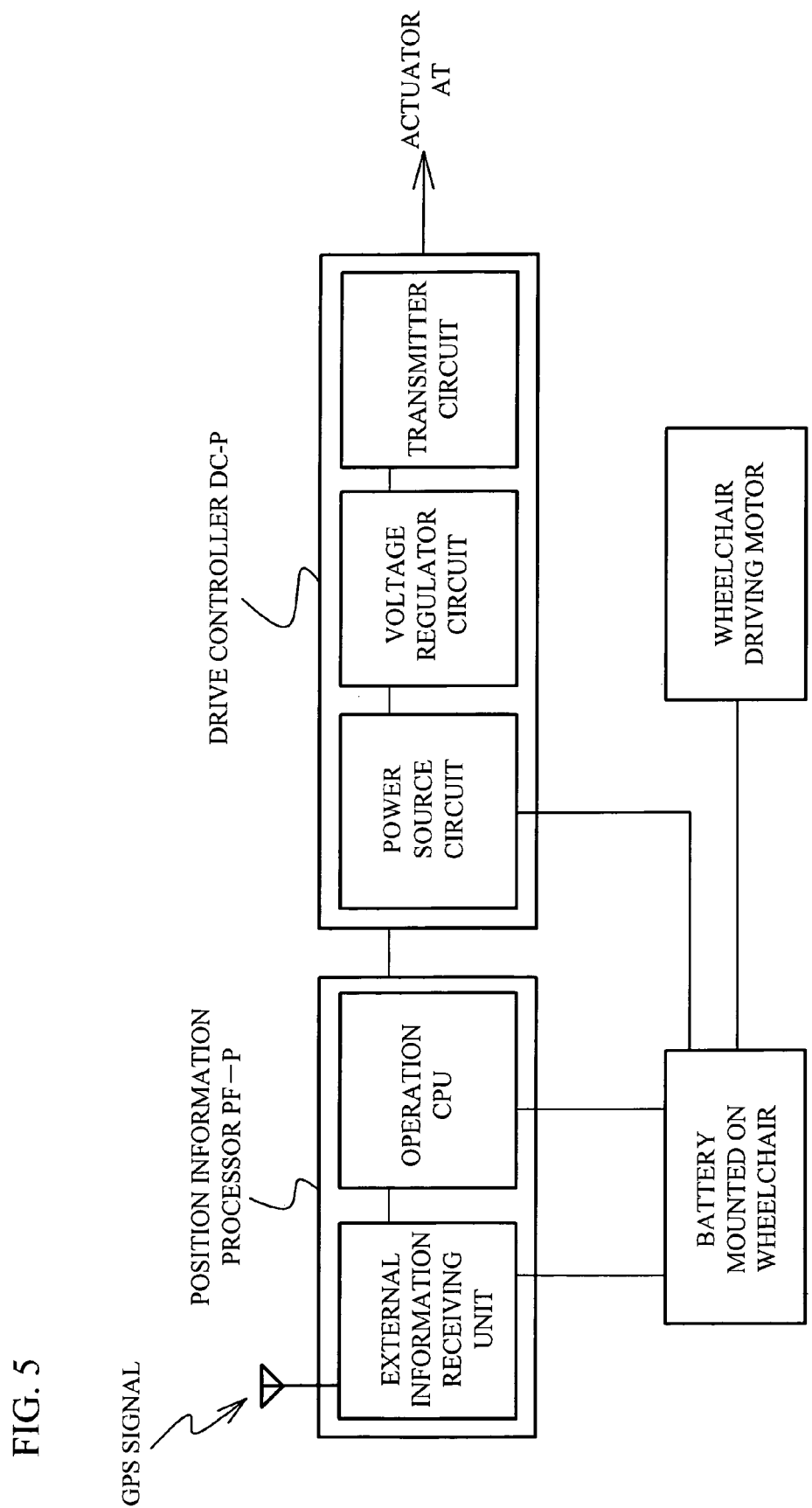
FIG. 5 is a block diagram showing the structure for controlling the actuator that indicates the traveling direction of the electric wheelchair.

FIG. 5 is a block diagram showing the structure for controlling the actuator AT that indicates the traveling direction of the electric wheelchair MW. The electric wheelchair MW includes a position information processor PF-P that serves as a navigation unit for identifying the traveling direction by detecting a route, and a drive controller DC-P that controls the actuator AT, based on a signal supplied from the position information processor PF-P.

Like a vehicle having a navigation device mounted therein, the electric wheelchair MW receives a GPS (Global Positioning System) signal, recognizes its own position, and then identifies the subject route. The position information processor PF-P shown in FIG. 5 obtains current position information from a position information provider of the outside, and functions as a navigation device that guides the operator through the route to the destination that is set in advance with the use of map information. The position information processor PF-P has an external information processor and an operation CPU (Central Processing Unit). The external information processor checks its own position by receiving a GPS signal. The operation CPU checks its own position with the use of map information that is provided in the CPU, and searches for and determines the route to the destination. The operation CPU then outputs a signal in accordance with the determined route.

The drive controller DC-P functions as a drive controlling unit that controls the actuator AT, based on a signal supplied from the position information processor PF-P. More specifically, based on a signal supplied from the operation CPU, The drive controller DC-P causes the key top 13 of the actuator AT to slide in the direction in which the electric wheelchair MW is about to move. The drive controller DC-P includes a power circuit, a voltage regulator circuit, and a transmitter circuit.

The position information processor PF-P and the drive controller DC-P are driven by a mounted battery that is provided to drive the wheelchair driving motor, as shown in FIG. 5.

Figure 6A:
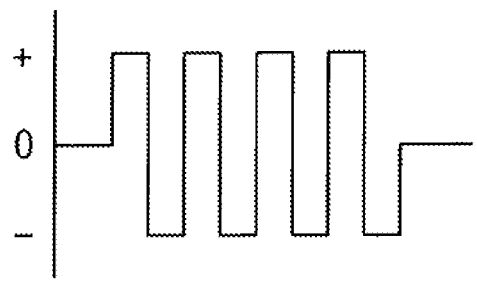
FIGS. 6A through 6C show examples of voltage waveforms when the drive controller controls the drive of the actuator.
Figure 6B:
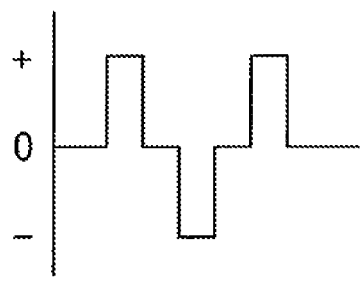
Figure 6C:
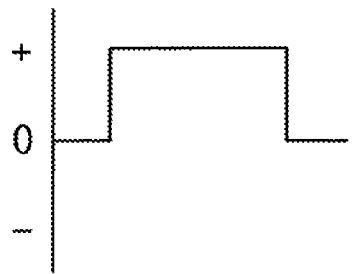

FIGS. 6A through 6C show examples of voltage waveforms that are observed when the drive controller DC-P controls the drive of the actuator AT in accordance with a signal supplied from the position information processor PF-P. FIG. 6A shows a voltage waveform observed when the key top 13 of the actuator AT is caused to slide in a reciprocating manner in the X-axis direction (the transverse direction of the electric wheelchair, for example) in a short period of time. FIG. 6B shows a voltage waveform observed when the key top 13 is caused to slide in a reciprocating manner at timewise intervals. FIG. 6C shows a voltage waveform observed when the key top 13 is caused to slide to and stay at the right side, and then return to the original position. Those actions are linked beforehand to the information about the directions to be indicated, so that the tactual sensation of the operator can be stimulated, and the operator can notice each indicated direction. As for the Y-axis direction, the same waveforms as above are formed for the voltage to be controlled, and the key top 13 is moved in a sliding manner, so as to stimulate the tactual sensation of the operator and to inform the operator of the desired direction.

Figure 7A:
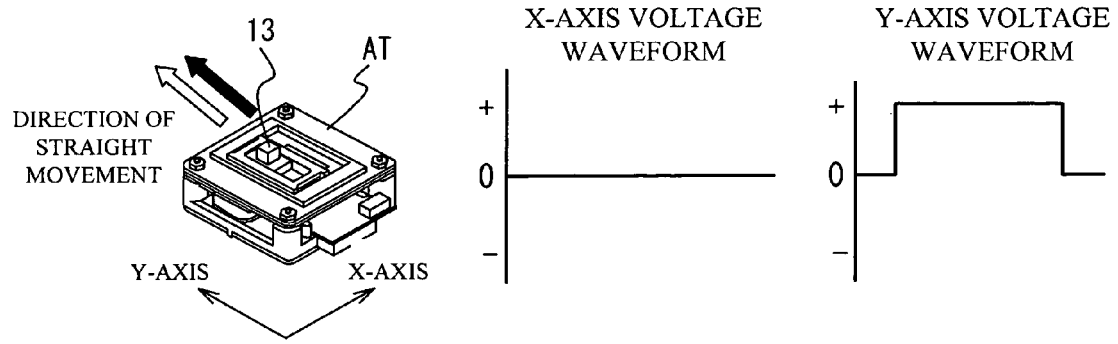
FIGS. 7A and 7B show examples of sliding actions of the actuator in a case where the X-axis direction and the Y-axis direction are combined.
Figure 7B:
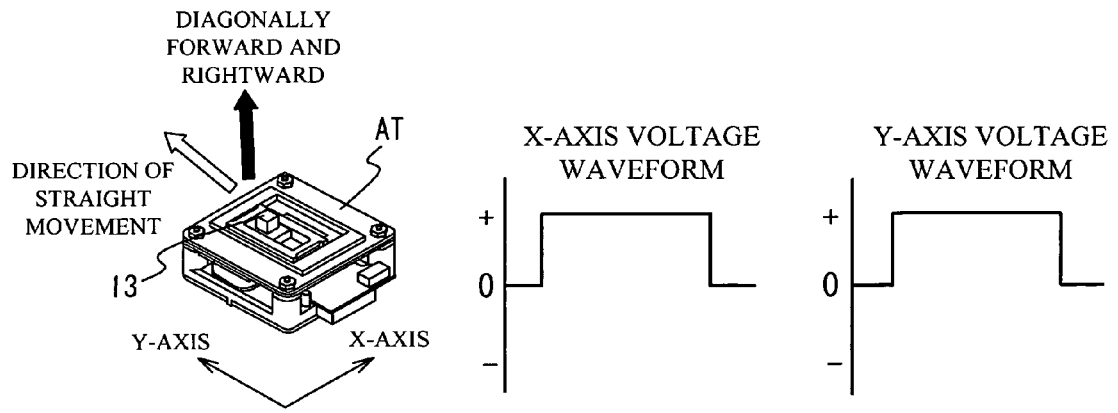

FIGS. 7A and 7B show examples of sliding actions of the actuator AT in a case where the X-axis direction and the Y-axis direction are combined. FIG. 7A shows a case where a positive voltage is applied only in the Y-axis direction, so as to cause the key top 13 of the actuator AT to slide forward in a direction parallel to the traveling direction. In the case shown in FIG. 7A, the key top 13 slides in a direction parallel to the traveling direction, stays at the front end for a certain period of time, and then returns to the center position. This sliding action is linked beforehand to straight movement, so as to stimulate a thumb of the operator and to inform the operator of the traveling direction. Likewise, FIG. 7B shows a case where a positive voltage is applied in the X-axis direction and the Y-axis direction. The key top 13 of the actuator AT slides diagonally forward and rightward with respect to the traveling direction, and stays at the front end for a certain period of time. This sliding action is linked beforehand to the rightward diagonal movement.

Figure 8:
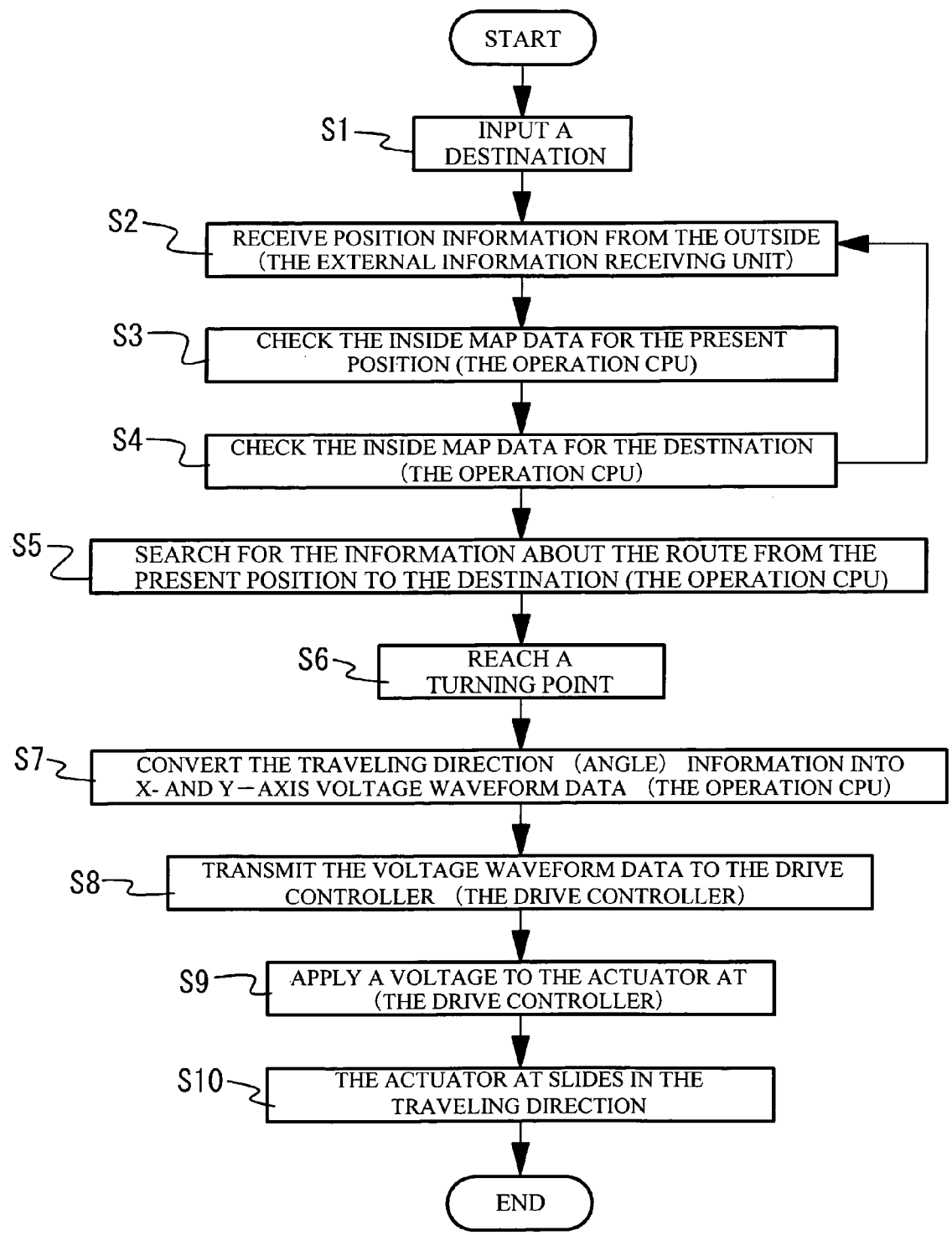
FIG. 8 shows the traveling direction guiding operation to be performed by the position information processor and the drive controller in cooperation with each other.

FIG. 8 shows the moving direction guiding operation to be performed by the position information processor PF-P and the drive controller DC-P shown in FIG. 5 in cooperation with each other. In the block diagram shown in FIG. 5, the operation CPU of the position information processor PF-P and the drive controller DC-P are shown separately from each other, to facilitate understanding of the invention. However, the position information processor PF-P and the drive controller DC-P may be realized by a CPU.

As described above, the position information processor PF-P has the same functions as a navigation device. Although not shown in the drawings, an input device for inputting a destination is installed in the electric wheelchair. When a destination is input (S1), the external information receiving unit of the position information processor PF-P receives position information (such as a GPS signal) from the outside (S2). The operation CPU then checks the inside map data (map information) for the present position (S3) and check the destination (S4), and then carries out a search for the information about the route from the present position to the destination (S5).

After the route from the present position of the electric wheelchair MW to the destination is determined in the above described manner, the wheelchair MW reaches a turning point (a cross point) (S6), and the operation CPU converts traveling direction information into the X- and Y-axis voltage waveform data (S7). The voltage waveform data is transferred to the drive controller DC-P (S8), and the drive controller DC-P applies a predetermined voltage to the actuator AT (S9). As a result, the key top 13 performs an action such as a sliding action in a direction parallel to the traveling direction (S10). This sliding action stimulates the fingers of the operator grabbing the operation unit of the electric wheelchair MW. Thus, the operator can be certainly notified of the indicated direction through the stimulation of tactual sensation.

The electric wheelchair MW having the above described navigation function uses an actuator to indicate the traveling direction by stimulating the tactual sensation of the operator. In this manner, the operator can be informed of a direction through tactual sense, instead of the visual or auditory sense. Particularly, as the device for simulating the tactual sensation, the electromagnetic drive actuator AT that has the key top 13 sliding in a plane is used. With the actuator AT, the traveling distance is set at a predetermined length or more, so that the tactual sensation of the operator is stimulated at a hand or fingers. Thus, the operator can be certainly notified of the indicated direction only through the tactual sense.

(First Modification)

Figure 9:
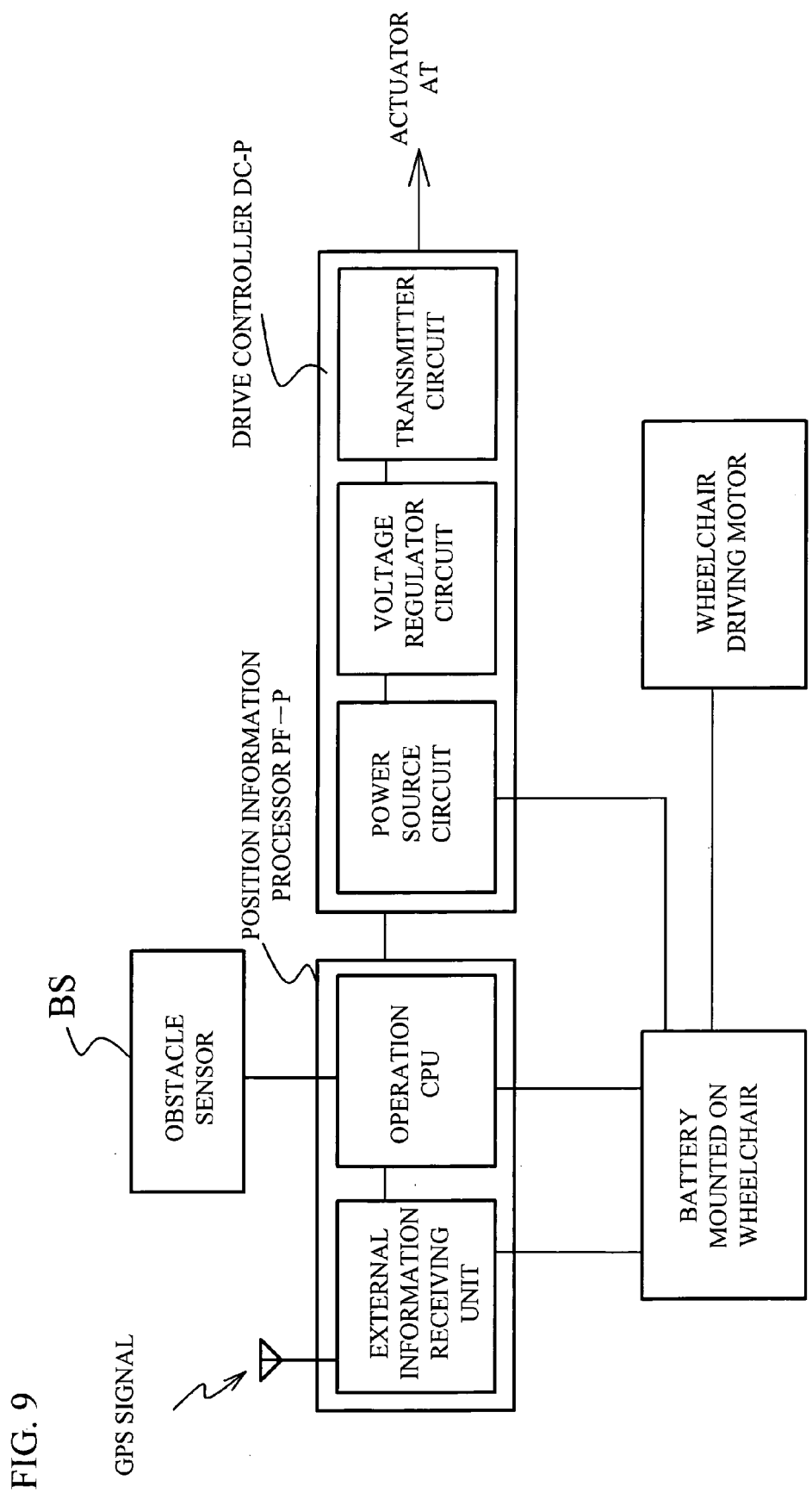
FIG. 9 is a block diagram illustrating a first modification of the first embodiment.

The following is a description of a modification of the first embodiment. FIG. 9 is a block diagram showing a first modification of the first embodiment. In this block diagram, components equivalent to the components shown in FIG. 5 are shown. As shown in FIG. 9, an obstacle sensor BS is added in the first modification, and a detection signal is supplied from the obstacle sensor BS to the operation CPU. As the obstacle sensor BS, a ultrasonic sensor, an optical sensor, or millimeter-wave radar for detecting obstacles in the surroundings may be provided in the electric wheelchair MW.

Figure 10:
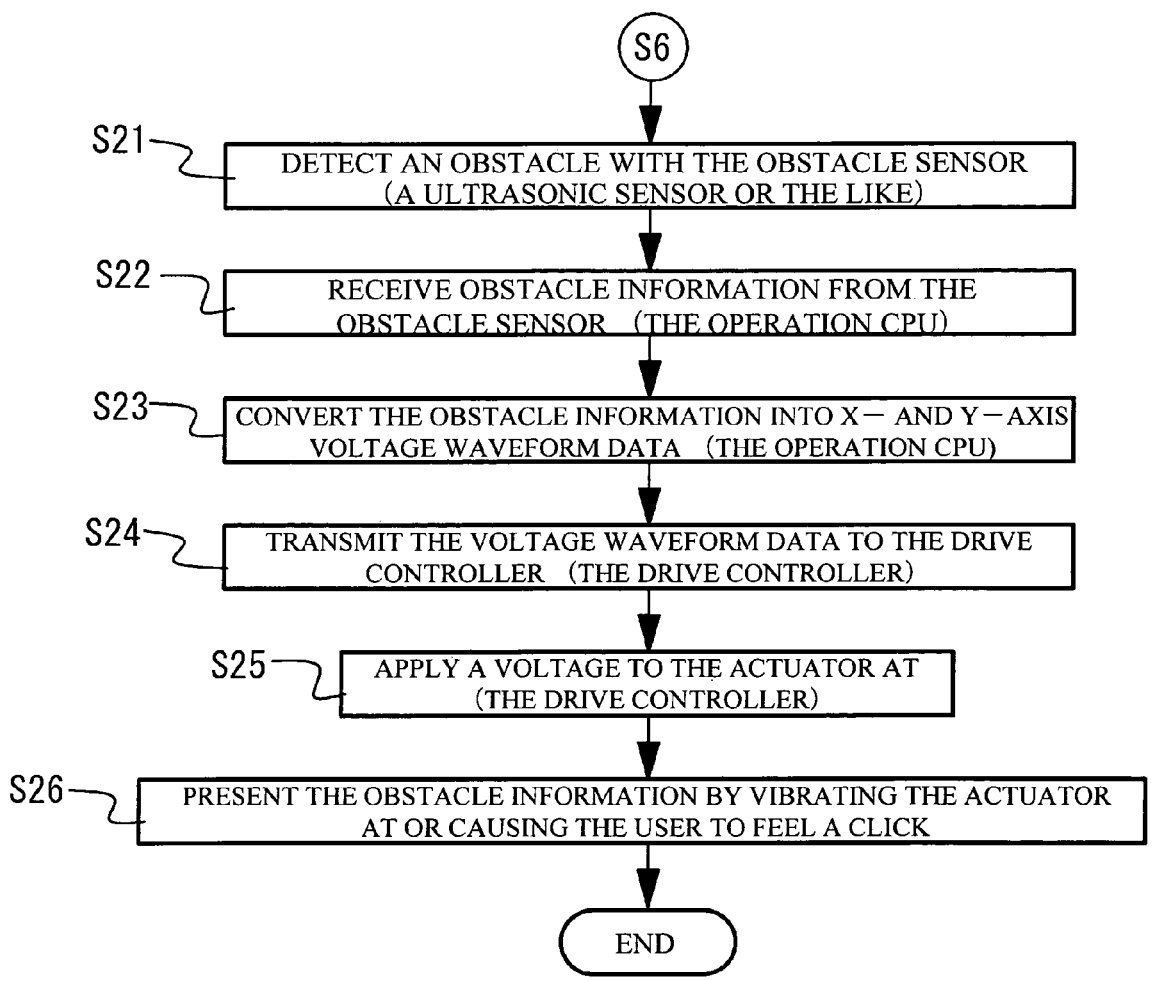
FIG. 10 shows a traveling direction guiding operation that is improved to avoid obstacles in accordance with the first modification.

FIG. 10 shows the traveling direction guiding operation of the first embodiment that is improved by employing the obstacle sensor to avoid obstacles located in the traveling direction. The procedures of the first half of the operation shown in FIG. 10 are the same as the procedures of the first half (S1 through S6) of the flowchart showing the traveling direction guiding operation in FIG. 8. Therefore, the procedures of the last half are described below as steps S21 through S26.

If the obstacle sensor BS detects an obstacle (S21) when the electric wheelchair MW reaches a turning point (S6), the operation CPU receives the detection signal (S22). The operation CPU converts the obstacle information into the X- and Y-axis voltage waveform data (S23). The voltage waveform data is transferred to the drive controller DC-P (S24), and the drive controller DC-P applies a predetermined voltage to the actuator AT (S25). In this case, the actuator AT vibrates or performs such an action as to make the operator feel a click. In this manner, the operator is informed of the existence of the obstacle (S26). If the traveling can be continued by informing the operator of the existence of the obstacle, a regular sliding action may be performed thereafter, so as to inform the operator of the changed traveling direction. If the traveling cannot be continued due to the obstacle, it is preferable that a predetermined warning is issued.

(Second Modification)

Figure 11:
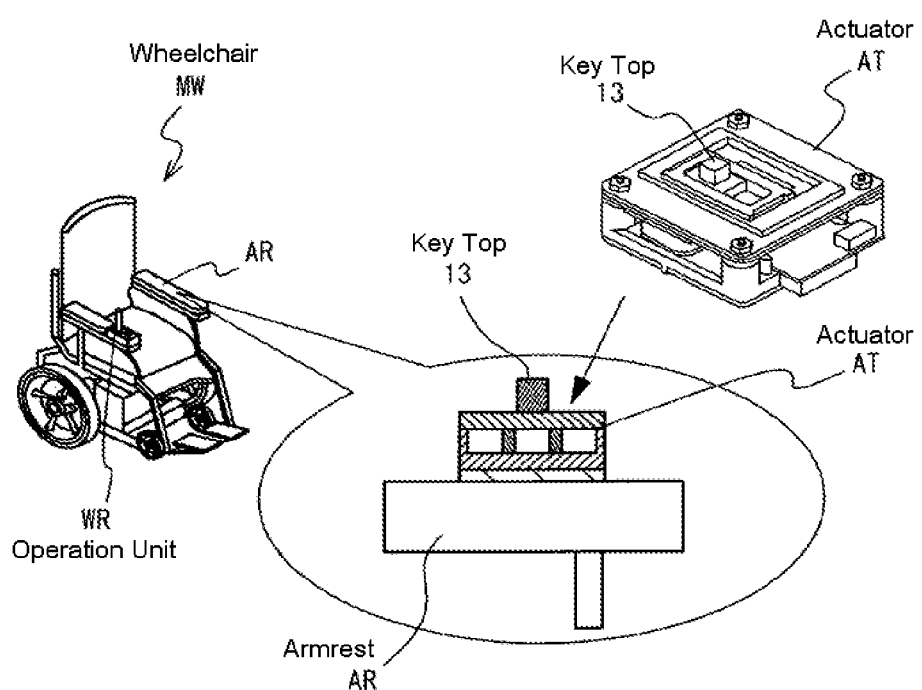
FIG. 11 illustrates an electric wheelchair that has the actuator in the opposite armrest from the operation part in accordance with a second modification of the first embodiment.

A second modification of the first embodiment is now described. FIG. 11 shows an electric wheelchair MW in accordance with the second modification in which the actuator AT is placed in the armrest AR on the opposite side from the operation unit WR. In the above described embodiment, the actuator AT is incorporated into the lever of the operation unit WR. In such a case, the placement position of the actuator AT is limited, and the actuator AT needs to be small. On the other hand, in the case illustrated in FIG. 11, the actuator AT is placed in the armrest AR on the opposite side from the operation unit WR. In this manner, a certain degree of freedom is allowed in the design and placement of the actuator AT. In the case of the second modification shown in FIG. 11, the tactual sensation of the operator is stimulated not only at his/her fingers, but also at his/her palm, his/her arm, or his/her elbow, when the operator is informed of the direction.

(Third Modification)

Figure 12:
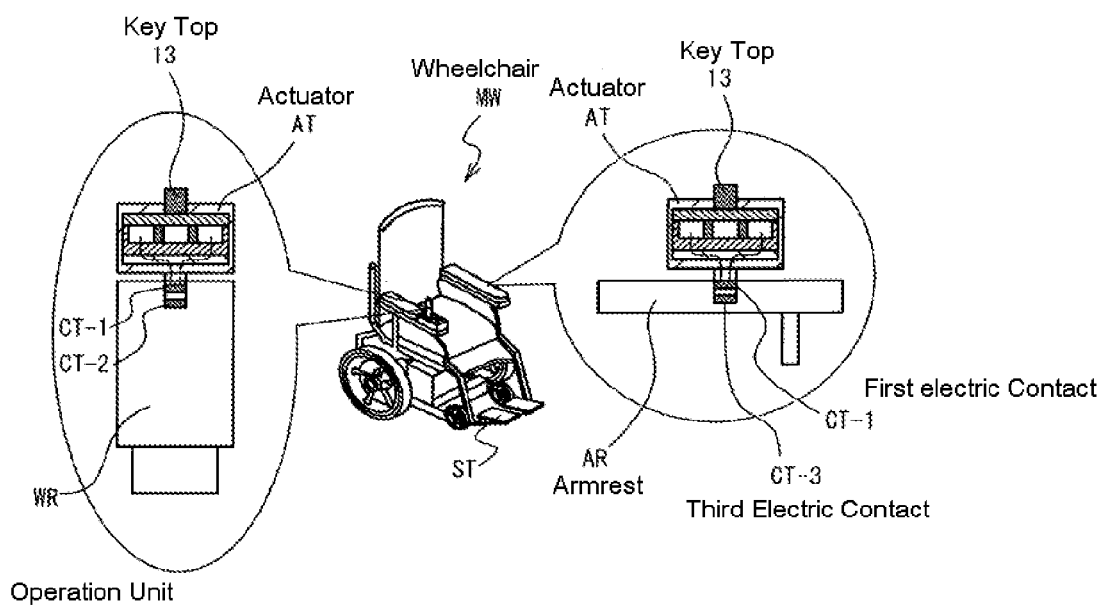
FIG. 12 illustrates a third modification of the first embodiment in which the actuator is detachable.

A third modification of the first embodiment is now described. FIG. 12 shows the third modification in which the actuator AT is detachably formed. In the third modification, a first electric contact CT-1 is formed in the actuator AT. A second contact CT-2 to face the first contact CT-1 and a structure for supporting the actuator AT are provided at the upper end of the operation unit WR. Likewise, a third contact CT-3 to face the first contact CT-1 and a structure for supporting the actuator AT are also provided in the armrest AR.

With the structure in accordance with the third modification shown in FIG. 12, the actuator AT can be attached and detached in accordance with a request from the operator who is using the electric wheelchair MW. As the actuator AT is detachable, any specific disabled part of the operator can be coped with. If the operator is a person who has lost his/her left arm, the actuator AT is placed at the operation unit WR. If the operator is a person who has disabled right-hand fingers, the actuator AT is placed in the armrest AR. In accordance with the condition and a request of the operator, the location of the actuator in the electric wheelchair MW in accordance with the third modification can be changed. Accordingly, the electric wheelchair MW can be shared by two or more persons. The location of the actuator shown in FIG. 12 is merely an example. For example, the actuator may be placed on the step ST on which the operator puts his/her feet. The third modification provides a structure in which the actuator AT is made detachable so that the location of the actuator AT can be changed. However, it is also possible to place the actuator AT in a slidable fashion so that the location of the actuator AT can be changed within a predetermined area.

[Second Embodiment]

Figure 13:
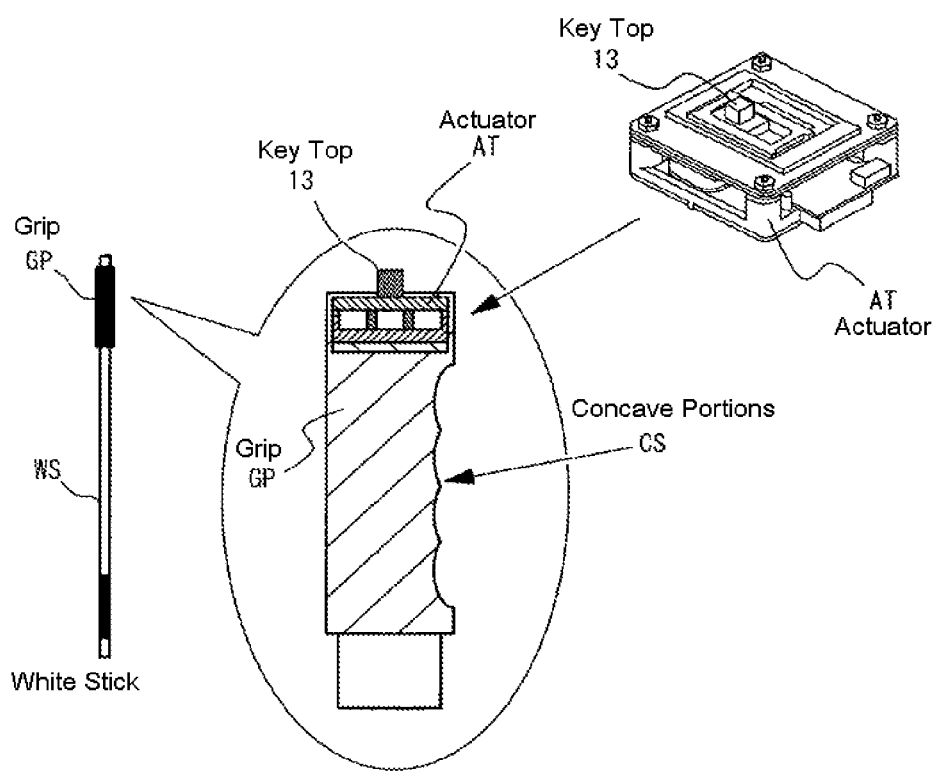
FIG. 13 illustrates a white stick for visually-impaired people in accordance with a second embodiment that employs a direction indicating function.

A second embodiment of the present invention is now described. In the second embodiment, the same structure as the structure employed in the electric wheelchair MW of the first embodiment is employed in a walking stick. In the following description of the second embodiment, the same components as those of the first embodiment are denoted by the same reference numerals as those used in the first embodiment, and explanation of them is omitted here. FIG. 13 shows a white stick WS for a visually-impaired person in accordance with the second embodiment. This white stick WS has the function of indicating a direction. Like the electric wheelchair MW of the first embodiment, the white stick WS has a navigation function, and stimulates the tactual sensation of a visually-impaired person at his/her hand through a sliding action of the actuator AT, so as to inform the person of the traveling direction or the like. More specifically, the actuator AT is set at the top end of a gripping part GP at the upper portion of the white stick WS. With this arrangement, the key top 13 can stimulate the tactual sensation of the user at his/her thumb, so as to inform the user of the direction. Concave portions CS that can be sensed as the finger gripping points by the user are formed on the gripping part GP of the white stick WS. When the white stick WS is used, the orientation of the stick WS stays the same, and the user can be informed of the direction through a sliding action of the key top 13.

Figure 14:
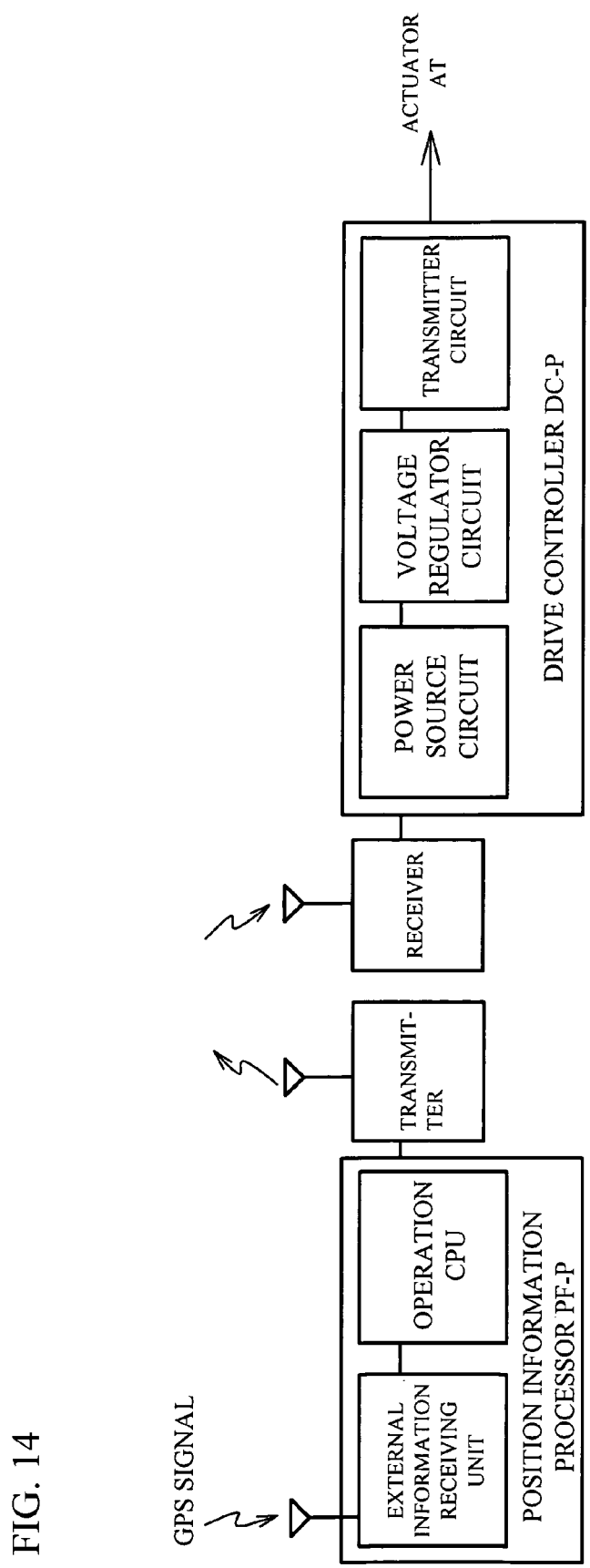
FIG. 14 is a block diagram showing the structure for controlling the drive of the actuator that is set on the white stick of the second embodiment.

FIG. 14 is a block diagram showing the structure for controlling the drive of the actuator AT that is set on the white stick WS. In the case of the electric wheelchair MW of the first embodiment, all the components such as the driving battery, the position information processor PF-P having the navigation function, and the drive controller DC-P for controlling sliding actions of the actuator AT can be mounted on the electric wheelchair MW. In the case of the white stick WS of the second embodiment, on the other hand, the space is limited. Therefore, the actuator AT, the drive controller DC-P for controlling the drive of the actuator AT, and a receiver are set in a small space on the stick. Meanwhile, the position information processor PF-P is formed separately from the other components, and is designed to transmit driving signals for the actuator AT. The position information processor PF-P formed separately from the other components may be designed as an independent device, but it is more preferable that the position information processor PF-P is formed as a function of a portable telephone device or a PDA (Personal Digital Assistant), for example. The user of the white stick WS or a person accompanying the user carries the position information processor PF-P designed as above, so that the white stick WS can be used in the same manner as the electric wheelchair MW.

(First Modification)

Figure 15:
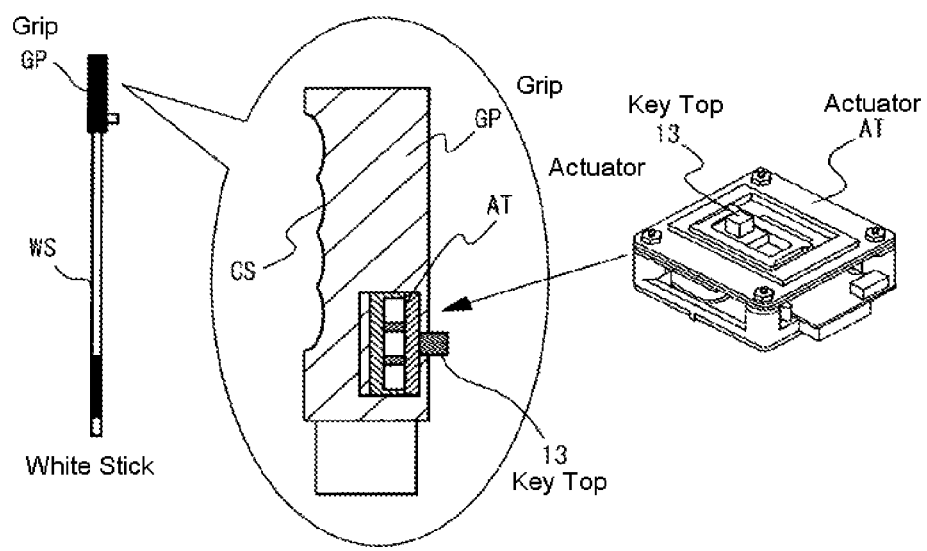
FIG. 15 illustrates a first modification of the second embodiment in which the location of the actuator is changed to a side of the gripping part.

The following is a description of a modification of the second embodiment. FIG. 15 shows a first modification of the second embodiment in which the actuator AT is placed at a side of the gripping part GP. As shown in FIG. 15, the actuator AT is placed on the opposite side from the concave portions CS to be gripped by the user. With this arrangement, the tactual sensation is stimulated at a thumb or a palm of the user. In a case where the actuator AT is placed vertically as in this modification, it is necessary to determine in advance that the top represents the forward direction and the bottom represents the backward direction, for example.

(Second Modification)

Figure 16:
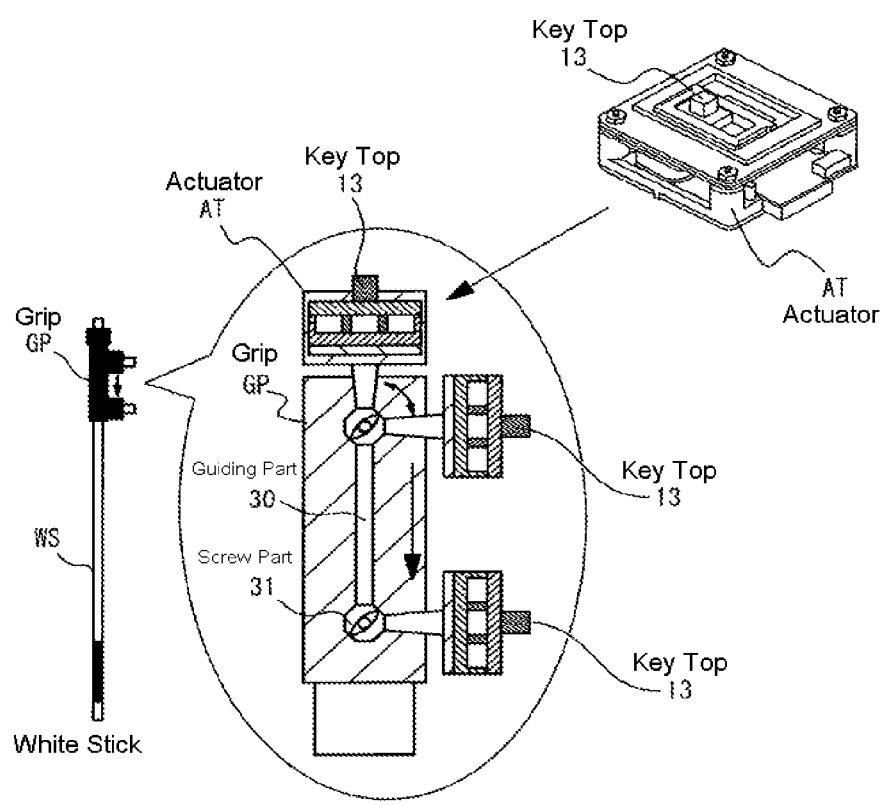
FIG. 16 illustrates a second modification of the second embodiment that has a structure for moving the actuator on the gripping part.

A second modification of the second embodiment is now described. FIG. 16 shows the second modification in which a structure for moving the actuator AT is provided on the gripping part GP. More specifically, the gripping part GP has a guiding part 30 for movement and a screw part 31 for fixing the actuator AT at a desired location. With the white stick WS of this modification, the location of the actuator AT can be changed in accordance with the physical condition or the preference of the user. Since the location of the actuator AT can be changed in accordance with the condition or a request of the user, the white stick WS can be shared by two or more persons.

(Third Modification)

Figure 17:
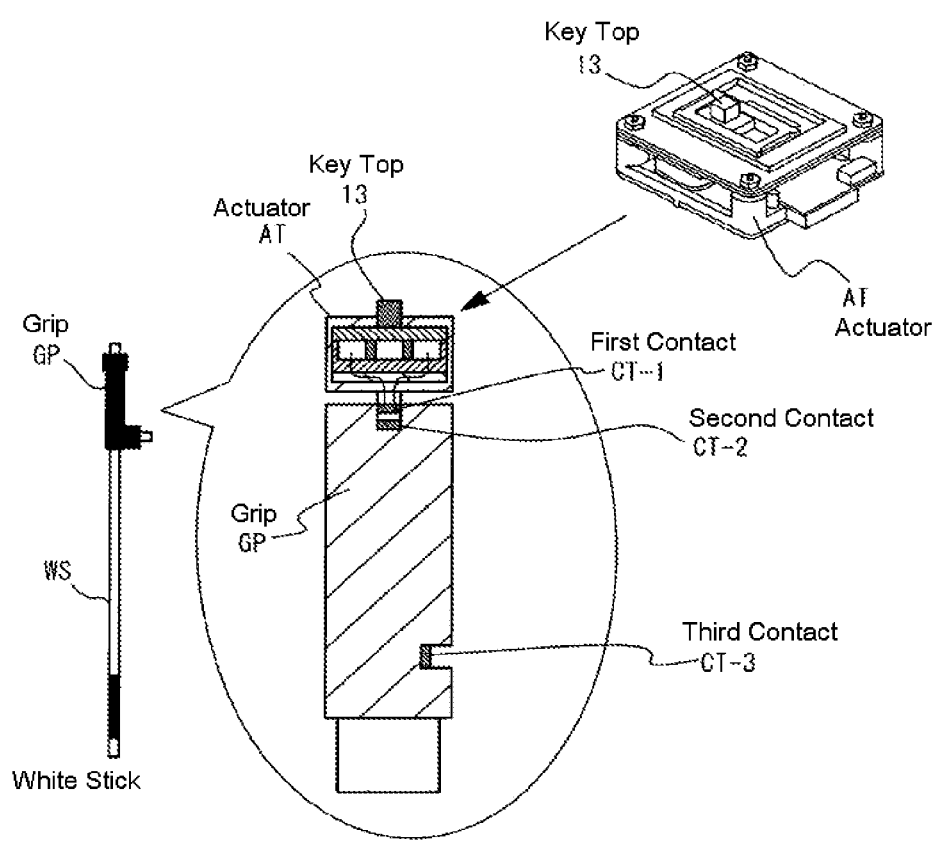
FIG. 17 illustrates a third modification of the second embodiment in which the actuator is detachable.

A third modification of the second embodiment is now described. FIG. 17 shows the third modification in which the actuator AT is made detachable. In the third modification, a first electric contact CT-1 is formed on the actuator AT. A second contact CT-2 for allowing the first contact CT-1 to be attached and detached is provided at the top end of the gripping part GP of the white stick WS, and a third contact CT-3 for allowing the first contact CT-1 to be attached and detached is provided at a side of the gripping part GP. In the white stick WS of the third modification, the location of the actuator AT can be changed in accordance with the condition or a request of the user. Since the location of the actuator AT can be changed in accordance with the condition or a request of the user, the white stick WS of this modification can be shared by two or more persons.

[Third Embodiment]

Figure 18A:
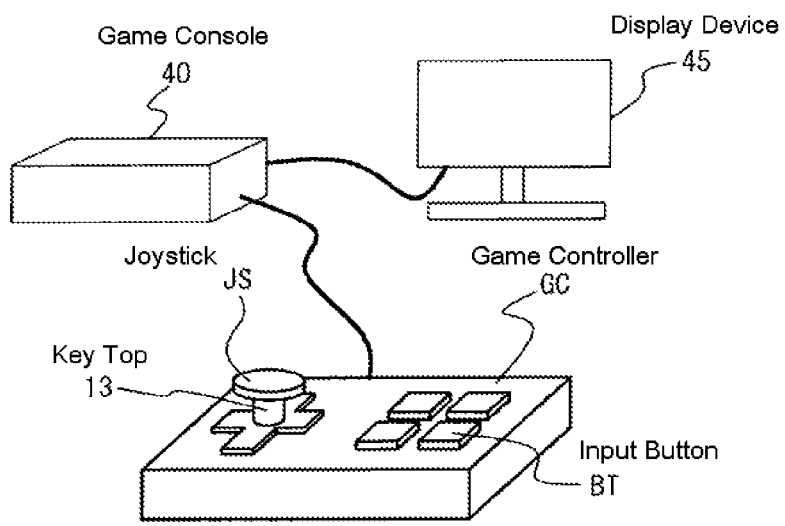
FIG. 18A is an external perspective view of a game controller in use in accordance with a third embodiment of the present invention.
Figure 18B:
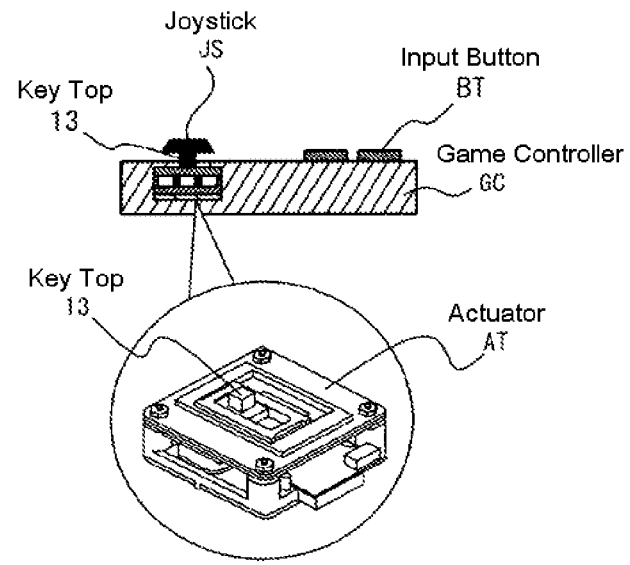
FIG. 18B is a cross-sectional side view of the game controller in accordance with the third embodiment.

Referring now to FIGS. 18A and 18B, a third embodiment of the present invention is described. The third embodiment relates to a game controller. FIGS. 18A and 18B illustrate a game controller GC in accordance with this embodiment. FIG. 18A is an external perspective view of the game controller GC in use. FIG. 18B is a cross-sectional side view of the game controller GC. As shown in FIG. 18A, this game controller GC is connected to a game console 40, and is used to control a game displayed on a display device 45.

The player of a game normally handles a joystick JS and an input button BT on the game controller GC in accordance with the application software that is set in the game console 40. As shown in FIG. 18B, the actuator AT is used at the base portion of the joystick JS of the game controller GC. Also, a circuit that checks the direction indicating information in accordance with the contents of the application software and generates the X- and Y-axis voltage waveform data based on the direction indicating information is installed in the game console 40. Accordingly, with an output signal from the game console 40 being used as drive instructing information, the key top 13 of the actuator AT in the game controller GC can be moved in a sliding manner.

For example, when a car racing game for simulating a vehicle running on roads is used as the application software, the joystick JS of the game controller GC is caused to slide side to side, so as to stimulate the tactual sensation of the player at his/her palm or the like. Such a game controller GC can be suggested as an assisting device for a player who is visually impaired, or as an assisting function for a young child to experience a game.

As described above, the present invention can provide a direction indicator system that stimulates the tactual sensation of a user with the use of a simple structure, and can certainly indicate a direction based on direction indicating information. An electric wheelchair, walking stick, or game controller that employs this system can certainly inform the user of the indicated direction. Thus, a user-friendly device or apparatus can be provided.

Although a few preferred embodiments of the present invention have been shown and described, it would be appreciated by those skilled in the art that changes may be made in these embodiments without departing from the principles and spirit of the invention, the scope of which is defined in the claims and their equivalents.

The present application is based on Japanese Patent Application No. 2007-015421 filed Jan. 25, 2007, the entire disclosure of which is hereby incorporated by reference.

What is claimed is:

1. A direction indicator system comprising:
an electromagnetic drive actuator that has a moving part that stimulates tactile sensation of an operator at his/her hand or fingers by sliding back and forth, side to side, and diagonally, the moving part sliding in a given two-dimensional region;
a drive controlling unit that controls a sliding direction of the moving part, based on direction indicating information that is supplied from the outside and;
an obstacle sensor that detects an obstacle existing in a traveling direction,
wherein the drive controlling unit changes the control of the electromagnetic drive actuator in accordance with obstacle information supplied from the obstacle sensor.

2. The direction indicator system as claimed in claim 1, further comprising
a navigation unit that obtains current position information from a position information provider of the outside,
wherein the drive controlling unit controls the electromagnetic drive actuator, based on route information that is provided as the direction indicating information by the navigation unit.

3. An electric wheelchair comprising the direction indicator system as claimed in claim 2.

4. The electric wheelchair as claimed in claim 3, wherein the electromagnetic drive actuator is placed in an operation part for driving operations or in an armrest.

5. The electric wheelchair as claimed in claim 3, wherein the electromagnetic drive actuator is placed in an operation part for driving operations or in an armrest, the electromagnetic drive actuator being located in a variable position or being detachable.

6. A walking stick comprising the direction indicator system as claimed in claim 2.

7. The walking stick as claimed in claim 6, wherein the electromagnetic drive actuator is placed on an upper portion or a side portion of a gripping part.

8. The walking stick as claimed in claim 6, wherein the electromagnetic drive actuator is located in a variable position in the gripping part or is detachable from the gripping part.

9. The walking stick as claimed in claim 6, wherein concave portions for indicating a gripping position are formed on a gripping part.

10. A game controller comprising
the direction indicator system as claimed in claim 1,
wherein the drive controlling unit controls the electromagnetic drive actuator, based on the direction indicating information that is supplied from a game console.

11. A method of indicating a direction, comprising:
sliding a moving part of an electromagnetic drive actuator back and forth, side to side, and diagonally in a given two-dimensional region;
stimulating tactile sensation of an operator at his/her hand or fingers;
supplying direction indicating information from the outside;
controlling a sliding direction of the moving part based on the direction indicating information;
detecting an obstacle existing in a traveling direction; and
changing the control of the moving part in accordance with information about the obstacle.

12. A direction indicator system comprising:
an electromagnetic drive actuator that has a moving part that can stimulate tactual sensation of an operator at his/her hands or fingers by sliding back and forth, side to side, and diagonally, the moving part sliding in a given two-dimensional region;
a drive controlling unit that controls a sliding direction of the moving part, based on direction indicating information that is supplied from the outside; and
an obstacle sensor that detects an obstacle existing in a traveling direction,
wherein the drive controlling unit changes the control of the electromagnetic drive actuator in accordance with obstacle information supplied from the obstacle sensor,
wherein the moving part is fixed to a slider that moves with a coil placed so as to face magnets fixed onto a substrate.

* * * * *